US011262996B2

(12) United States Patent
Offer

(10) Patent No.: US 11,262,996 B2
(45) Date of Patent: *Mar. 1, 2022

(54) REPOSITORY INCLUDING EXCLUSION LIST

(71) Applicant: VMware, Inc., Palo Alto, CA (US)

(72) Inventor: Richard Offer, Wallingford (GB)

(73) Assignee: VMware, Inc., Palo Alto, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/056,068

(22) Filed: Oct. 17, 2013

(65) Prior Publication Data
US 2014/0040328 A1 Feb. 6, 2014

Related U.S. Application Data

(63) Continuation of application No. 12/190,995, filed on Aug. 13, 2008, now Pat. No. 8,577,937, and a continuation-in-part of application No. 12/027,847, filed on Feb. 7, 2008, now Pat. No. 9,015,180, and a continuation-in-part of application No. 11/900,402, filed on Sep. 10, 2007, now Pat. No. 7,971,047, and a continuation-in-part of application No. 11/895,518, filed on Aug. 27, 2007, now Pat. No. 8,219,987, and a continuation-in-part of application No. 11/746,578, filed on May 9, 2007, now Pat. No. 8,171,482, and a
(Continued)

(51) Int. Cl.
*G06F 16/00* (2019.01)
*G06F 8/61* (2018.01)
*G06F 16/11* (2019.01)

(52) U.S. Cl.
CPC .............. *G06F 8/61* (2013.01); *G06F 16/11* (2019.01)

(58) Field of Classification Search
CPC ................................ G06F 16/11; G06F 16/30
USPC ......................................................... 707/200
See application file for complete search history.

(56) References Cited

U.S. PATENT DOCUMENTS 5,159,687 A 10/1992 Richburg
5,375,241 A 12/1994 Walsh
(Continued)

OTHER PUBLICATIONS

U.S. Appl. No. 11/746,546, filed May 9, 2007, Vlaovic et al.
(Continued)

*Primary Examiner* — Anhtai V Tran

(57) ABSTRACT

Systems and methods of executing and/or provisioning an application in an application specific runtime environment or general runtime environment are disclosed. The application specific runtime environment or general runtime environment are optionally defined by an application environment specification to include a minimal or reduced set of software resources required for execution of the application. These software resources are optionally stored in a resource repository that includes resources associated with a plurality of operating systems and/or executable applications. Various embodiments of the invention include the development of hierarchical resource metadata configured to characterize the various files, packages and file families included in the resource repository. In some embodiments this metadata is used to select between files when provisioning an application specific runtime environment. Various embodiments of the invention include use of an exclusion list to manage conflicts between same named files.

20 Claims, 5 Drawing Sheets

Related U.S. Application Data continuation-in-part of application No. 11/746,546, filed on May 9, 2007, now Pat. No. 7,971,182.

(56) References Cited

U.S. PATENT DOCUMENTS

| | | | |
|---|---|---|---|
| 5,701,487 A | 12/1997 | Arbouzov | |
| 5,708,811 A | 1/1998 | Arendt et al. | |
| 5,838,980 A | 11/1998 | Guillen et al. | |
| 5,923,880 A | 7/1999 | Rose et al. | |
| 5,946,486 A | 8/1999 | Pekowski | |
| 5,960,200 A | 9/1999 | Eager et al. | |
| 6,011,917 A | 1/2000 | Leymann et al. | |
| 6,230,312 B1 | 5/2001 | Hunt | |
| 6,238,290 B1 | 5/2001 | Tarr et al. | |
| 6,266,805 B1 | 7/2001 | Nwana et al. | |
| 6,272,674 B1 | 8/2001 | Holiday | |
| 6,292,933 B1 | 9/2001 | Bahrs et al. | |
| 6,314,555 B1 | 11/2001 | Ndumu et al. | |
| 6,397,381 B1 | 5/2002 | Delo et al. | |
| 6,446,256 B1 | 9/2002 | Hyman et al. | |
| 6,487,713 B1 | 11/2002 | Cohen et al. | |
| 6,523,172 B1 | 2/2003 | Martinez-Guerra et al. | |
| 6,542,167 B1 | 4/2003 | Darlet et al. | |
| 6,735,666 B1 | 5/2004 | Koning | |
| 6,742,175 B1 | 5/2004 | Brassard | |
| 6,779,187 B1 | 8/2004 | Hammond | |
| 6,793,638 B1 | 9/2004 | DeToro et al. | |
| 6,836,884 B1 | 12/2004 | Evans et al. | |
| 6,865,732 B1 | 3/2005 | Morgan | |
| 6,892,379 B2 | 5/2005 | Huang | |
| 6,934,933 B2 | 8/2005 | Wilkinson et al. | |
| 7,075,919 B1* | 7/2006 | Wendt et al. | 370/352 |
| 7,171,674 B2 | 1/2007 | Arrouye et al. | |
| 7,188,332 B2 | 3/2007 | Charisius et al. | |
| 7,275,098 B1 | 9/2007 | Becher et al. | |
| 7,343,585 B1 | 3/2008 | Lau et al. | |
| 7,426,721 B1 | 9/2008 | Saulpaugh et al. | |
| 7,516,440 B2 | 4/2009 | Upton | |
| 7,530,065 B1 | 5/2009 | Ciudad et al. | |
| 7,533,365 B1 | 5/2009 | Hogstrom et al. | |
| 7,536,686 B2 | 5/2009 | Tan et al. | |
| 7,549,148 B2 | 6/2009 | Cross et al. | |
| 7,552,420 B1 | 6/2009 | Smith et al. | |
| 7,565,640 B2 | 7/2009 | Shukla et al. | |
| 7,577,959 B2 | 8/2009 | Nguyen et al. | |
| 7,584,461 B2 | 9/2009 | Plum | |
| 7,650,590 B2 | 1/2010 | Bender | |
| 7,681,186 B2 | 3/2010 | Chang et al. | |
| 7,703,073 B2 | 4/2010 | Illowsky et al. | |
| 7,734,492 B2 | 6/2010 | Sun et al. | |
| 7,735,062 B2 | 6/2010 | de Seabra e Melo et al. | |
| 7,735,071 B2 | 6/2010 | Abrams et al. | |
| 7,747,980 B2 | 6/2010 | Illowsky et al. | |
| 7,779,404 B2 | 8/2010 | Movassaghi et al. | |
| 7,788,238 B2 | 8/2010 | Gabriel et al. | |
| 7,788,647 B2 | 8/2010 | Martin et al. | |
| 7,788,662 B2 | 8/2010 | Haselden et al. | |
| 7,810,080 B2 | 10/2010 | Plum et al. | |
| 7,810,082 B2 | 10/2010 | Levenshteyn | |
| 7,814,459 B2 | 10/2010 | Behnan et al. | |
| 7,818,714 B2 | 10/2010 | Ryan et al. | |
| 7,818,729 B1 | 10/2010 | Plum et al. | |
| 7,895,591 B2 | 2/2011 | Spears | |
| 7,921,408 B2 | 4/2011 | Shenfield et al. | |
| 7,941,801 B2 | 5/2011 | Williams et al. | |
| 7,953,850 B2 | 5/2011 | Mani et al. | |
| 7,971,047 B1 | 6/2011 | Vlaovic et al. | |
| 7,971,182 B1 | 6/2011 | Vlaovic et al. | |
| 8,001,527 B1 | 8/2011 | Qureshi et al. | |
| 8,006,224 B2 | 8/2011 | Bateman et al. | |
| 8,132,149 B2 | 3/2012 | Shenfield et al. | |
| 8,171,141 B1 | 5/2012 | Offer et al. | |
| 8,171,470 B2 | 5/2012 | Goldman et al. | |
| 8,171,482 B1 | 5/2012 | Vlaovic et al. | |
| 8,176,466 B2 | 5/2012 | Tristram | |
| 8,219,987 B1 | 7/2012 | Vlaovic et al. | |
| 8,225,311 B1 | 7/2012 | Robertson et al. | |
| 8,234,622 B2 | 7/2012 | Meijer et al. | |
| 2003/0060188 A1 | 3/2003 | Gidron et al. | |
| 2003/0105642 A1* | 6/2003 | Andino, Jr. | G06Q 10/10 705/321 |
| 2005/0138193 A1* | 6/2005 | Encarnacion et al. | 709/230 |
| 2005/0172281 A1 | 8/2005 | Goring et al. | |
| 2005/0222986 A1* | 10/2005 | Heix | G06F 17/30067 |
| 2006/0253426 A1* | 11/2006 | Bilotti | G06F 16/24556 |
| 2006/0288054 A1 | 12/2006 | Johnson et al. | |
| 2007/0043860 A1* | 2/2007 | Pabari | G06F 9/5072 709/224 |
| 2007/0101197 A1 | 5/2007 | Moore et al. | |
| 2007/0101342 A1 | 5/2007 | Flegg et al. | |
| 2007/0244987 A1 | 10/2007 | Pedersen et al. | |
| 2008/0005611 A1 | 1/2008 | Solyanik | |
| 2008/0046708 A1 | 2/2008 | Fitzgerald et al. | |
| 2008/0065633 A1* | 3/2008 | Luo | G06F 17/30867 |
| 2008/0178172 A1 | 7/2008 | Dossa et al. | |
| 2009/0083314 A1 | 3/2009 | Maim | |
| 2011/0231440 A1 | 5/2011 | Vlaovic | |

OTHER PUBLICATIONS

U.S. Appl. No. 11/746,578, filed May 9, 2007, Vlaovic et al.
U.S. Appl. No. 11/895,518, filed Aug. 24, 2007, Vlaovic et al.
U.S. Appl. No. 11/900,402, filed Sep. 10, 2007, Vlaovic.
U.S. Appl. No. 12/027,847, filed Feb. 7, 2008, Offer.
U.S. Appl. No. 12/239,558, filed Sep. 26, 2008, Offer.
U.S. Appl. No. 12/354,399, filed Jan. 15, 2009, Offer.
U.S. Appl. No. 12/495,638, filed Jun. 30, 2009, Offer et al.
U.S. Appl. No. 12/639,957, filed Dec. 16, 2009, Offer et al.
SCBXP: El-Hassan et al., "An efficient CAM based XML parsing technique in hardware environments," IEEE, pp. 1-9, 2011.
Foulkes et al., "Software configuration management and its contribution to reliability program management", IEEE, pp. 289-292, 1983.
Mei et al., "A software configuration mangement model for supporting component based software development", ACM SIGSOFT, vol. 26, No. 2, pp. 53-58, 2001.
Nilsson et al., "Parsing formal languages using natural language parsing techniques", ACM IWPT, pp. 49-60, 2009.
Render et al., "An object oriented model of software configuration management", ACM, pp. 127-139, 1991.
Van der Hoek et al., "A tested for configuration management policy programming," IEEE, vol. 28, No. 1, pp. 79-99, 2002.
Vlaovic et al., U.S. Appl. No. 13/149,289 entitled, "Application Specific Runtime Environments", filed May 31, 2011.
Cardellini et al., "Efficient provisioning of service level agreements for service oriented applications", ACM IW-SOSWE, pp. 29-35, 2007.
Sharma et al., "Provisioning multi tier cloud applications using statistical bounds on sojourn time", ACM ICAC, pp. 43-52, 2012.
Urgonkar et al., "Agile dynamic provisioning of multi tier internet applications", ACM Trans. on Autonomous and Adaptive Sys., vol. 3, No. 1, pp. 1-39, 2008.

* cited by examiner

REPOSITORY INCLUDING EXCLUSION LIST

CROSS-REFERENCE TO RELATED APPLICATION

This application is a continuation of U.S. patent application Ser. No. 12/190,995 filed Aug. 13, 2008 and entitled "Repository Including Exclusion List,", which is a continuation-in-part of:
1) U.S. patent application Ser. No. 11/746,546 filed May 9, 2007 and entitled "Application Environment Specifications," issued as U.S. Pat. No. 7,971,182 on Jun. 28, 2011;
2) U.S. patent application Ser. No. 11/746,578 filed May 9, 2007 and entitled "Application Specific Runtime Environments," issued as U.S. Pat. No. 8,171,482 on May 1, 2012;
3) U.S. patent application Ser. No. 11/900,402 filed Sep. 10, 2007 and entitled "Operating System Environment and Installation," issued as U.S. Pat. No. 7,971,047 on Jun. 28, 2011;
4) U.S. patent application Ser. No. 11/895,518 filed Aug. 24, 2007 and entitled "Optimized Virtual Machine Specification," issued as U.S. Pat. No. 8,219,987 on Jul. 10, 2012; and
5) U.S. patent application Ser. No. 12/027,847 filed Feb. 7, 2008 and entitled "Repository Including File Identification". The disclosures of the above patent applications are incorporated by reference in their entirety for all purposes.

BACKGROUND

1. Field of the Invention

The Application is in the field of computing systems and more specifically in the field of provisioning computing devices.

2. Related Art

Currently, applications require specific environments in which to execute. For example, applications are usually constructed with a specific operating system environment in mind, and migrating to a different operating system environment requires a different version of the application. In addition to operating system environments, there are also specific hardware requirements associated with applications. At the base level, an application compiled for use on a specific instruction set architecture (ISA) will be unable to execute on a machine with a different ISA.

Commonly used routines are frequently encapsulated in libraries configured to be accessed by applications. These libraries are generally shared among many different applications, allowing the software developer to leverage common functionality and reduce the application's file size. This approach is advantageous when a number of different applications make use of the same commonly used routines. Libraries that an application uses, but are not included with the distribution of the application, need to be present in the application's executing environment to execute the application as intended.

It is common practice to provide a wide variety of libraries and/or individual helper routines in an operating environment in order to support a wide variety of applications. Together these supporting elements comprise a general runtime environment that provides software services for processes or programs while a computer is running. The general runtime environment may further include an operating system, an associated kernel, and software that runs beneath the operating system, such as hardware device drivers.

A general runtime environment may include many components that are not required by those applications that are actually executed. This may be a disadvantage in circumstances that include limits on available memory, storage or other resources consumed by the unused components, when the extra components conflict with each other or in attempting to reduce the attack footprint.

In some instances a general runtime environment is contained within a virtual machine environment. A virtual machine environment is an environment that appears from the point of view of a software application within the virtual machine environment to be an independent hardware device. However, more than one virtual machine environment may be placed on a single hardware device. Each virtual machine environment may have different characteristics. This allows the single hardware device to support multiple applications or multiple copies of the same application each within its own isolated virtual machine environment.

One approach to overcoming the limitations of general runtime environments is to generate an application specific runtime environment for execution of an application, and executing the application within this application specific runtime environment. An application specific runtime environment includes software functionality required for executing a specific application. For example, the application specific runtime environment may include an executable application, an operating system, libraries, hardware drivers, configuration files, data and any other software functionality required to execute the application. Generally, the application specific runtime environment includes a reduced or minimum set of resources and may not include resources that are not required by the specific application.

The application specific runtime environment is typically a subset of a general runtime environment. As such, the application specific runtime environment is a reduced environment that requires fewer resources than a general runtime environment. For example, an application specific runtime environment may require less memory during application execution and/or less storage. The application specific runtime environment for a particular application is defined by an application environment specification. An application environment specification may be used to create an application specific runtime environment on-demand in response to a request to execute the related application. For example, an application environment specification may be used to select files from a resource repository configured to store software resources. These software resources may include, for example, software libraries, files, drivers, and configuration information.

An application environment specification may be referred to as an Application Blueprint™ and an application specific runtime environment may be referred to as a Dynamic Application Bundle™ (DAB™). Further details of application specific runtime environments, application environment specifications, and repositories are found in the patent applications cited above and incorporated herein by reference.

SUMMARY

Embodiments of the invention include systems and methods of identifying files within a resource repository for inclusion in an application specific runtime environment. These systems and methods may be used to select from among a plurality of similarly or identically named files within the resources repository. For example, an application environment specification may include a reference to a file "libc.so.6" and a resource repository may include several files having the name "libc.so.6." These identically named files may have the same file contents, may be different related versions of a file or may be unrelated files that happen to have the same name. Several identically named files may be found in a resource repository that includes more than one file package.

Various embodiments of the invention include "repository metadata" which is metadata stored in a resource repository and configured for use in selecting files for inclusion in an application specific runtime environment or a general runtime environment responsive to an application environment specification and provisioning metadata. In some embodiments, the repository metadata includes an exclusion list of file packages that include identically named files, or some other common characteristic. This exclusion list is optionally used to assure that files from file packages that have identically named files are not included in the same installation of an executable application or operating system. For example, if a file package A and file package B both include a file named "libc.so.6," then the exclusion list is used to assure that none of the files of file package A are used in the same installation as any of the files from file package B. The file name optionally includes a directory path, universal resource locator, and/or the like.

The repository metadata is optionally hierarchical. For example, repository metadata may be associated with specific files, file packages, provenances, and/or file families. Each of these classifications is described further elsewhere herein. Typically, the repository metadata is generated as resources are added to the resource repository. To select a file from among a plurality of similarly named files, the repository metadata is compared with other metadata referred to herein as provisioning metadata. Provisioning metadata may be included in the application environment specification, be provided by a user, characterize a target platform on which an application is to be provisioned, and/or the like.

Various embodiments of the invention include a computer readable medium including repository metadata, a system configured to generate the repository metadata, a method of generating the repository metadata, a system configured for using the repository metadata, and/or a method of using the resource repository metadata to select a file for inclusion in an application specific runtime environment.

More specifically, various embodiments of the invention include data stored in a computer readable medium, the data comprising: a plurality of file family identifiers each configured to uniquely identify a member of a plurality of file families, respectively, the file families each being associated with a particular operating system or executable application; a plurality of package identifiers each configured to identify a member of a plurality of packages, respectively, the plurality of packages being part of the file families; a plurality of file identifiers each configured to identify a member of a plurality of files, respectively, the plurality of files being part of the plurality of packages; and repository metadata characterizing the files, packages and file families, configured to be compared with provisioning metadata, and including information configured for navigating from the file identifiers to the repository metadata characterizing the packages and file families.

Various embodiments of the invention include a system comprising: a parser configured to parse a received installation package for an operating system or an executable application and to identify files and packages within the installation package; a metadata generator configured to generate file family metadata, package metadata and file metadata based on information received from the parser as a result of parsing the installation package; and a repository configured to store the family metadata, package metadata and file metadata in a data structure.

Various embodiments of the invention include a system comprising: a computing device; a repository configured to store a plurality of resources, an application environment specification and repository metadata, the repository metadata being configured to characterize at least one file family and a plurality of files included within the file family; and a provisioning server configured to select resources from among the plurality of resources based on the application environment specification, to choose preferred resources from among the selected resources by comparing the repository metadata with provisioning metadata, and to provision an executable application or an operating system on the computing device by providing the preferred resources to the computing device.

Various embodiments of the invention include a method comprising: receiving a file family; establishing a unique family identifier for the file family; identifying a plurality of packages within the file family; establishing a package identifier for each of the plurality of packages, the package identifiers being unique within the file family; associating package metadata with each of the package identifiers, the package metadata comprising a link to the file family; identifying a plurality of files within each of the plurality of packages; establishing a file identifier for each of the plurality of files, the file identifiers being unique within each of the plurality of packages; associating file metadata with each of the plurality of files, the file metadata comprising a link to one or more of the plurality of packages in which each of the plurality of files is, respectively, included, the package metadata or the file metadata including information that can be compared with provisioning metadata; and storing the family identifier, package identifiers, package metadata, file identifiers, and file metadata in a hierarchical data structure on a computer readable medium.

Various embodiments of the invention include a method comprising: receiving file information including a file identifier; receiving provisioning metadata including characteristics of an application specific runtime environment or target; using the file identifier to identifying a plurality of files within a resource repository; reading repository metadata associated with each of the plurality of files, the read repository metadata including metadata associated with parent nodes of each of the plurality of files in a hierarchical metadata data structure; comparing the repository metadata to the provisioning metadata; and selecting one of the plurality of files based on the comparison.

Various embodiments of the invention include a system comprising a computing device; a repository configured to store a plurality of resources and repository metadata, the repository metadata being configured to characterize at least one file family and a plurality of files included within the file family, the repository metadata including an exclusion list comprising identifiers of packages within the at least one file family that include members of the plurality of files having the same names; and a provisioning server configured to select files from among the plurality of files using the exclusion list and to provision an executable application or an operating system on the computing device by providing the selected files to the computing device.

Various embodiments of the invention include a method comprising receiving file information including a file identifier; using the file identifier to identifying a plurality of files within a resource repository, the plurality of files having a same name; reading repository metadata associated with at least one of the plurality of files, the read repository metadata including an identity of a file package of which at the least one of the plurality of files is a member; selecting a first of the plurality of files; identifying a file package of the selected file; determining if the identified file package is on an installation specific conflict list; if the identified file package is on the installation specific conflict list, then selecting another of the plurality of files and repeating the steps of identifying a file package of the selected file and determining if the selected file is on the installation specific conflict list; using an exclusion list to identify any file packages that conflict with the file package of the selected file, the exclusion list including identifiers of file packages within a file family having same file names; and adding any packages identified using the exclusion list to the installation specific conflict list.

Various embodiments of the invention include a system comprising metadata generator configured to generate an exclusion list by identifying packages within a first file family that include files having same file names, the exclusion list comprising identifiers of the packages that include file having same names; metadata storage configured to store the exclusion list in association with the file family and to store metadata associating the packages with the files; and a repository configured to store files included in the first file family and files included in a second file family.

Various embodiments of the invention include a method comprising receiving a file family; identifying any files having the same name in the file family; identifying packages in which the identified files are included; adding the identified packages to an exclusion list; and storing the exclusion list in association with the file family.

Various embodiments of the invention include data stored in a computer readable medium, the data comprising a plurality of file family identifiers each configured to uniquely identify a member of a plurality of file families, respectively, the file families each being associated with a particular operating system or executable application; a plurality of package identifiers each configured to identify a member of a plurality of packages, respectively, the plurality of packages being part of the file families; a plurality of file identifiers each configured to identify a member of a plurality of files, respectively, the plurality of files being part of the plurality of packages; and repository metadata including an exclusion list of members of the plurality of packages that include different files having the same names.

DETAILED DESCRIPTION

Figure 1:
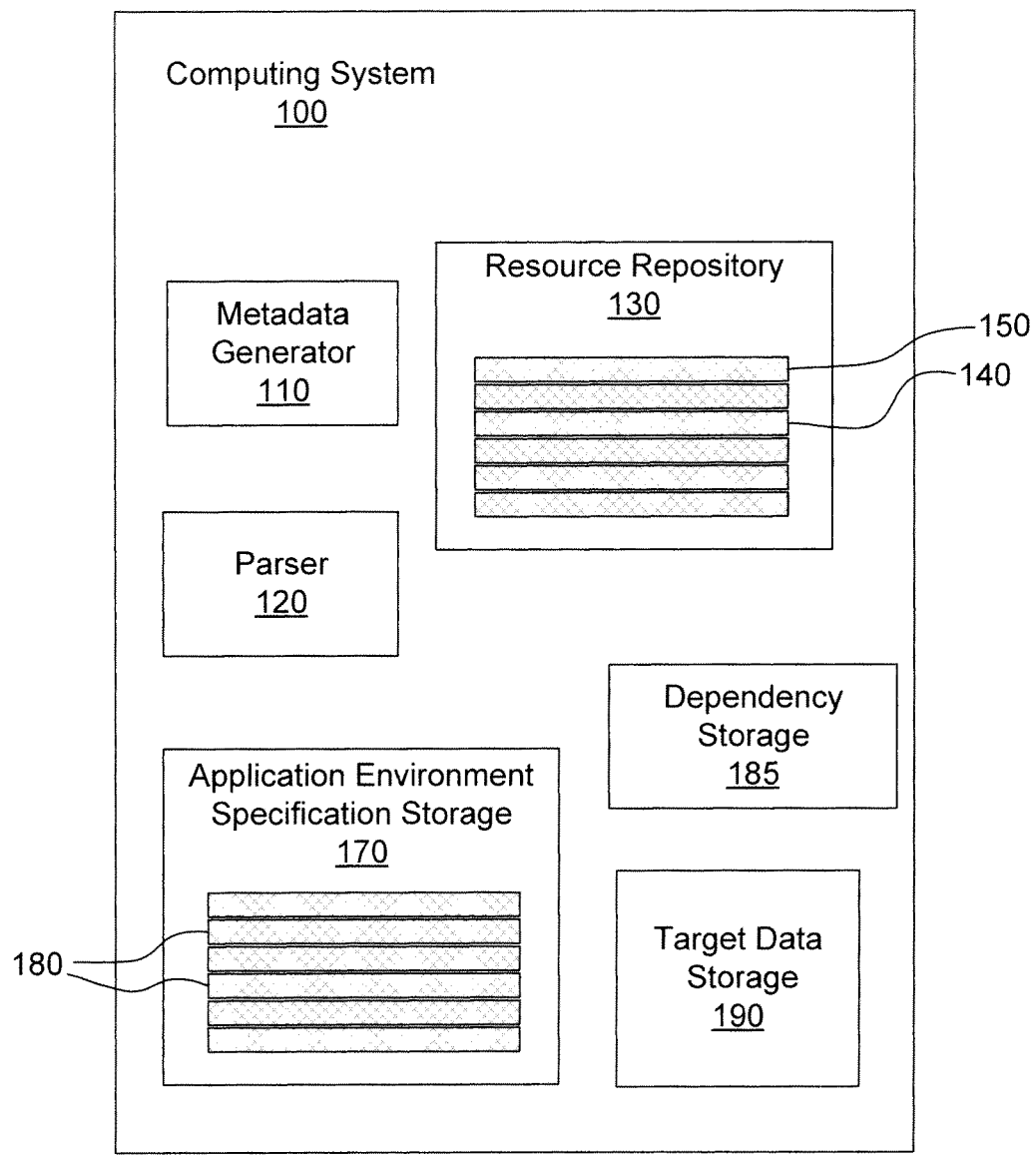
FIG. 1 illustrates a system configured for generating repository metadata, according to various embodiments of the invention.

To facilitate the provisioning of operating systems and/or executable applications on target platforms it may be useful to store resources required by these operating systems and/or executable applications in a resource repository. This resource repository includes data, files, libraries, and/or the like received as part of the operating systems and/or executable applications. This resource repository further includes resource metadata configured to help identify which resources should be used when provisioning a particular operating system or executable application according to an application environment specification.

Including resources for more than one file package, operating system and/or executable application in the same repository may be problematic. For example, different file packages within the same file family or different file families may include resources, e.g. files, having the same name. In the prior art conflicts are avoided by installing a specific file package. However, when files from different file packages are placed together in the same resource repository, conflicts may be managed at the file level rather than at the package level. When an application environment specification includes a filename that identifies files from more than one file package, an file family specific exclusion list and/or repository metadata associated with each of the files is used to determine which of several files having the filename should be used in the provisioning of the executable application or operating system.

The repository metadata optionally includes a hierarchical structure. At the top of this hierarchical structure is a file family. A "file family" is a set of files such as those that may be found in several sets of installation compact discs. For example, the file family may include the files used to install various versions of a particular operating system or executable application. Each file family can be identified using a unique family identifier. A family identifier is a globally unique identifier configured to identify a particular file family. Each file family is optionally also characterized by family metadata. "Family metadata" includes information, e.g., a name, provider, date, media type, or the like, that is related to a file family at the file family level of the hierarchical structure. For example, family metadata may include a name of an operating system or executable application. Family metadata may also include an exclusion list comprising identifiers of packages within the file family that include files having the same names.

The next level in the hierarchical structure of the repository metadata optionally comprises a provenance. A provenance is a subset of a file family having a particular origin or temporal history. For example, a provenance may include a set of software patches and/or service packs. Each provenance is characterized by a provenance identifier. A provenance identifier is an identifier that is configured to identify a particular provenance either by being globally unique or being unique within a particular file family. Each provenance is also optionally characterized by provenance metadata. Provenance metadata includes information specifying a specific origin, history of a provenance, or the like. Provenance metadata further includes links to a file family to which the provenance belongs.

The next level in hierarchical structure of the repository metadata comprises a package. A package is a subset of a provenance or a file family related to a particular version, feature set or compatibility of an operating system or executable application. A package is characterized by a unique package identifier as well as package metadata. A package identifier is an identifier that is that is configured to identify a particular package either by being globally unique or being unique within a provenance or file family. Each package is optionally characterized by package metadata. Package metadata includes information relating to a package name, version, feature set, hardware compatibility, software compatibility and/or the like. Package metadata further include explicit or implicit links, or other features configured for navigating from the package metadata to a provenance and/or a file family to which the package belongs.

The next level in the hierarchical structure of the repository metadata comprises a file. A file is the unit at which a file system stores and manipulates files and information, and also the object level at which an application environment specification typically identifies resources. Each file is characterized by a file identifier and file metadata. A file identifier is an identifier that is configured to identify a particular file either by being globally unique or being unique within a package, provenance or file family. Each file in the resource repository is optionally characterized by file metadata. File metadata includes information relating to a file location (e.g., pointer, universal resource locator, physical storage location, path or directory), file name, file type, permissions, modification date, and/or the like. File metadata further includes links to one or more package metadata, provenance metadata and/or family metadata, associated with a package provenance or family to which the associated file belongs. These links, and those links included in package metadata, provenance metadata, are optionally configured for navigating between the file metadata and file family metadata, package metadata and/or provenance metadata.

Some embodiments of the invention include a level of resource metadata below that of a file. This level is referred to as the inode level. An inode is a data structure on a file system that stores basic information about a function, file, directory, or other file system object. Modes store information such as user and group ownership, file contents, access mode (read, write, execute permissions) and types, and/or the like. Modes or the equivalent include stat data and are sometimes referred to as vnodes in the computing art.

An identifier, e.g., file family identifier, provenance identifier, or file identifier, can include a name, pointer, link, path, universal resource locator, IP address, memory location, or any other identifier configured for identifying objects within a computing system.

FIG. 1 is a block diagram of a Computing System 100 configured for generating Repository Metadata 150, according to various embodiments of the invention. Computing System 100 comprises a Metadata Generator 110, a Parser 120, a Resource Repository 130, an optional Application Environment Specification Storage 170, a optional Dependency Storage 185, and an optional Target Data Storage 190. Computing System 100 is configured to receive one or more executable application and/or operating system including various Resources 140, such as files, libraries, drivers, installation logic, and/or the like. As is discussed further herein, Computing System 100 optionally uses these received Resources 140 to identify the subset of the Resources 140 required by the executable application or operating system and to include identification of the subset as part of an application environment specification.

Metadata Generator 110 is configured to generate Repository Metadata 150 for each of Resources 140 received by Computing System 100. As discussed elsewhere herein, this Repository Metadata 150 is typically stored in Resource Repository 130 in a hierarchical structure including a file family level, an optional provenance level, a package level, a file level, and an optional inode level. Each level within hierarchal structure includes one or more links to those levels above it. Metadata Generator 110 is configured to parse received resources and to identify Repository Metadata 150 associated with each level. For example, when Metadata Generator 110 receives a set of files from an installation disk of an executable application, Metadata Generator 110 may assign these files to a particular file family, identify one or more packages included within the file family, and identify files included in each package. At the package level, Repository Metadata 150 characterizing each package, e.g., a package name, version, and/or the like, are generated and stored within a hierarchal data structure. Similarly, at the file level, Repository Metadata 150 characterizing each file, e.g., file names, locations, permissions, and the like, are generated and stored within the hierarchal data structure.

Metadata Generator 110 is further configured to generate an exclusion list comprising identifiers of packages that have the same file names. In some embodiments, the exclusion list comprises one or more groups of package identifiers. For example, if File Package A, File Package B and File Package C each include a file "libc.so.6" then the exclusion list may include the group ("A," "B," "C"). Further, if File Package A and a File Package D each include a file "libc.ini," then the exclusion may also include the group ("A," "D"). The exclusion list is generated by parsing each file package and comparing the names of files within each. Typically, the exclusion list is updated each time files are added to the resource repository as part of the file family. For example, if a patch is applied to the file family the exclusion list may be updated. The exclusion list is optionally stored as part of Repository Metadata 150 within Resource Repository 130.

In some embodiments, the exclusion list includes files that have the same name and different contents. For example, if File Package A and File Package B each include a file "libc.so.6" then these two same named files may be compared. If the files are different, then a group ("A," "B") is included in the exclusion list, and if they are the same, then the group ("A," "B") is not included in the exclusion list.

Optional Parser 120 is configured to parse a received executable application and determine those Resources 140 required by the executable application. These Resources 140 may be listed in an application environment specification. The parsing includes, for example, identifying grammatical structures, variables, data, symbols, and symbol definitions within the executable application. Parser 120 is configured to receive the executable application as compiled computing instructions, native executable format, byte compiled instructions, interpreted instructions, Java, Perl, Python, batch file, script, and/or the like. In some embodiments, Parser 120 is configured to generate a tree data structure that reflects the grammatical structure of the executable application. For example, Parser 120 may operate in two stages, a first stage including identifying meaningful elements in the input, and a second stage including building a dependency tree of those elements. This dependency tree is stored in optional Dependency Storage 185. Parser 120 is optionally configured to provide file name information to Metadata Generator 110 to generate the exclusion list.

Parser 120 is configured to identify those symbols within the executable application that are defined by a definition within the same Resource 140 as the symbol and those symbols that are not defined by a definition within the same Resource 140. For those symbols that are not defined by a definition within the executable application, Parser 120 is configured to search other Resources 140 for a definition. These Resources 140 are stored within Resource Repository 130 and may include files, libraries, a kernel, drivers, and or the like. Resource Repository 130 includes storage such as random access memory, static memory, a hard drive, an optical drive, or the like. In some embodiments, Resource Repository 130 is distributed among several storage devices.

Some of the Resources 140 included in Resource Repository 130 and identified in Dependency Storage 185 may themselves include undefined symbols. These symbols are identified by processing each Resource 140 using Parser 120 in a manner similar to the processing that is applied to the executable application. The identification of dependencies may, thus, be performed as an iterative process. As such, a hierarchy of dependencies can be identified and stored in Dependency Storage 185.

A list of Resources 140 required for the execution of the executable application or operating system is stored as an application environment specification in Application Environment Specification Storage 170. Application Environment Specification Storage 170 includes one or more random access memory, static memory, hard drive, optical drive, or the like. The application environment specification may include Records 180 comprising data identifying each of the resources indicated as being required for the execution of the executable application or operating system. This data may be retrieved from Dependency Storage 185 after the processing of the executable application and required resources using Parser 120, and can also include additional resources such as application configuration data or files, etc. In alternative embodiments, Dependency Storage 185, Resource Repository 130 and/or Application Environment Specification Storage 170 are combined into a single storage.

In some embodiments, the application environment specification stored in Application Environment Specification Storage 170 is specific to a predetermined hardware target. Information about this hardware target is optionally stored in a Target Data Storage 190. For example, if the target includes a specific display device and a specific processor type, this information is stored in Target Data Storage 190 and used by Computing System 100 for the selection of an appropriate application environment specification.

In some embodiments, Metadata Generator 110 is included within Parser 120. In these embodiments, repository metadata, such as an exclusion list, may be generated during the identification of resource dependencies. Metadata Generator 110 and Parser 120 may include hardware, firmware, and/or software embodied on a computer readable medium.

Figure 2:
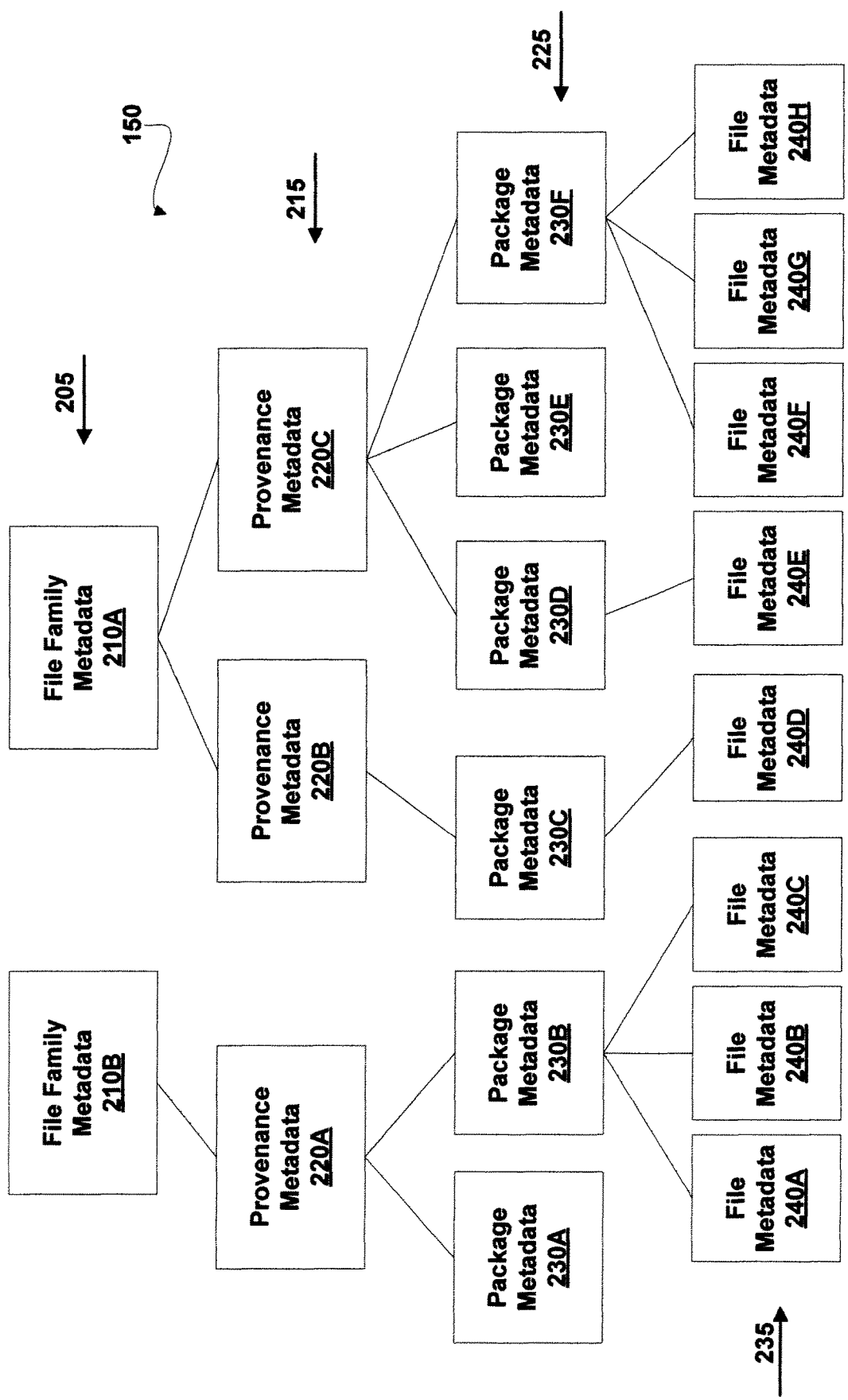
FIG. 2 illustrates repository metadata including a hierarchical structure, according to various embodiments of the invention.

FIG. 2 illustrates Repository Metadata 150 including a hierarchical structure, according to various embodiments of the invention. The hierarchical structure includes a File Family Level 205, an optional Provenance Level 215, a Package Level 225 and a File Level 235. One or more sets of File Family Metadata 210 are included within the File Family Level 205. For example, FIG. 2 illustrates a File Family Metadata 210A and a File Family Metadata 210B. File Family Metadata 210A and 210B are each related to different operating systems or executable programs. For example, File Family Metadata 210B may be associated with a Linux operating system such as RedHat™ 4.4, while File Family Metadata 210A may be associated with an executable application such as an accounting program. File Family Metadata 210A and File Family Metadata 210B are generated by Metadata Generator 110 and each optionally include an exclusion list.

At the optional Provenance Level 215 are stored one or more Provenance Metadata 220, such as a Provenance Metadata 220A, a Provenance Metadata 220B and a Provenance Metadata 220C. Each Provenance Metadata 220 includes provenance metadata characterizing a particular provenance and further includes a link to the member of File Family Metadata 210 of which the particular provenance is a member. For example, File Family Metadata 210A characterizes a file family that includes two provenances. These provenances are characterized by Provenance Metadata 220B and Provenance Metadata 220C.

The Package Level 225 comprises one or more Package Metadata 230. Examples of Package Metadata 230A through 230F are illustrated in FIG. 2. Each Package Metadata 230 includes metadata characterizing a particular package as well as a link to the Provenance Metadata 220 and/or File Family Metadata 210 that characterize the provenance and/or file family to which the particular package belongs. For example, Package Metadata 230D characterizes a package that is a member of the provenance characterized by Provenance Metadata 220C, which in turn is a member of the file family characterized by File Family Metadata 210A.

The File Level 235 comprises one or more Files Metadata 240, of which examples 240A through 240H are illustrated in FIG. 2. Each of File Metadata 240 characterizes a particular file and includes a link to the Package Metadata 230, Provenance Metadata 220 and/or File Family Metadata 210 above in the hierarchical data structure. For example, in some embodiments, File Metadata 240E includes file metadata characterizing a particular file as well as a link to Package Metadata 230D and a link to File Family Metadata 210A.

Repository Metadata 150 may also include an inode level comprising one or more inodes, not shown. Repository Metadata 150 often includes many more File Metadata 240, Package Metadata 230, Provenance Metadata 220 and/or File Family Metadata 210 than are shown in FIG. 2. Repository Metadata 150 is configured such that it is straight forward to identify the particular package, provenance and/or file family that a particular file belongs to by navigating from File Metadata 240 to the other types of metadata.

Figure 3:
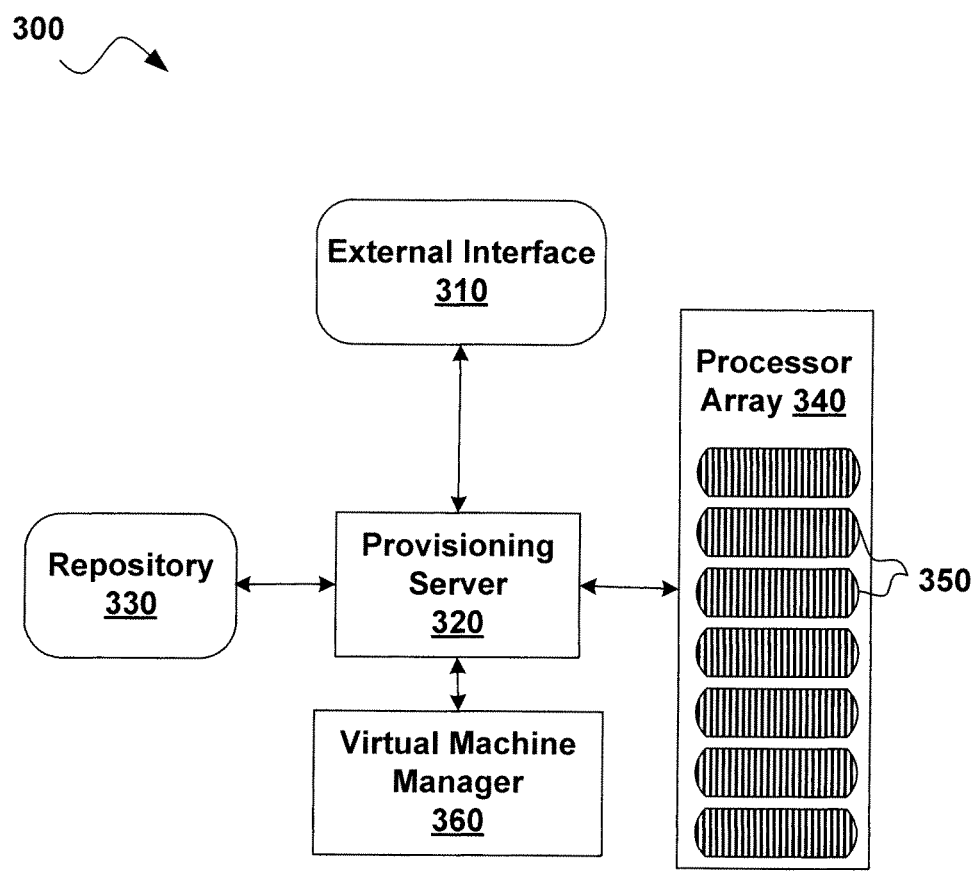
FIG. 3 illustrates a system configured for using repository metadata to select a file for inclusion in an application specific runtime environment.

FIG. 3 illustrates an Application Provisioning System 300 configured for using Repository Metadata 150 to select a file for inclusion in an application specific runtime environment, according to various embodiments of the invention. The Application Provisioning System 300 is typically configured for supporting a plurality of executable applications and/or operating systems each in a possibly different application specific runtime environment. Application Provisioning System 300 may be used, for example, to provide executable applications to an enterprise or other group of users. When Application Provisioning System 300 is used to provide multiple executable applications, the advantages of using application specific runtime environments rather than general runtime environments are achieved for each executable application. In some embodiments, Application Provisioning System 300 is configured for using Repository Metadata 150 to provision both an operating system and an executable application.

The Application Provisioning System 300 comprises an optional External Interface 310, a Provisioning Server 320, a Repository 330, and an optional Processor Array 340. The Provisioning Server 320 is in communication with the External Interface 310, the Repository 330, and the Processor Array 340.

External Interface 310 is configured for an end user or an administrator to request execution of one or more executable application or operating system. For example, in some embodiments, External Interface 310 includes a network interface configured to receive commands from remote user clients, and an administrative terminal configured for use by an administrator of Application Provisioning System 300. In some embodiments, External Interface 310 is configured for a user to request creation of a virtual machine including an image of an application specific runtime environment. Typically, Application Provisioning System 300 is configured to support a variety of different executable applications and to execute these executable applications in parallel.

Repository 330 includes Resource Repository 130 and Application Environment Specification Storage 170, and is thus configured to store a plurality of application environment specifications and resources required by executable applications and/or operating systems according to these specifications. Repository 330 is optionally further configured to store one or more virtual machine specification and/or application specific runtime environment image, each associated with an executable application and/or an application environment specification. A single copy of a resource stored in Repository 330 may be used by several different executable applications and/or operating systems. Repository 330 may include volatile memory, static memory, hard drives, optical drives, and/or other types of memory. Repository 330 is optionally distributed among more than one device.

Provisioning Server 320 is configured to provision and optionally cause execution of executable applications and/or operating systems in response to commands received from External Interface 310. For example, in some embodiments, Provisioning Server 320 is configured to receive a request for execution of a particular executable application, to provision an application specific runtime environment or a general runtime environment for the requested executable application according to an associated application environment specification, and to execute the executable application in the provisioned application specific runtime environment. Provisioning of the executable application or operating system optionally includes selecting files from among a plurality of files stored in Repository 330 using an exclusion list. Provisioning Server 320 may be configured to automatically update the exclusion list using Metadata Generator 110 when files (e.g., a patch) are added to a file family. In some embodiments, the exclusion list may also be updated by manual intervention and/or by an automatic intervention configured to use a feedback loop and self-learning capabilities. For example, if an actual conflict occurs during provisioning or execution of a program, then an automatic intervention routine may remember the conflict and intervene to prevent the conflict from occurring again.

The execution of the executable application optionally occurs on Processor Array 340. Provisioning Server 320 optionally includes an embodiment of Computing System 100. Provisioning Server 320 is optionally distributed among more than one device. In some embodiments, Provisioning Server 320 is configured to generate an image of an application specific runtime environment. One or more of these images may be stored in Repository 330 prior to use.

Provisioning Server 320 is configured to use Repository Metadata 150 to provision an application specific runtime environment and/or a general runtime environment. For example, in some embodiments Provisioning Server 320 uses Repository Metadata 150 to identify which files should be included in an application specific runtime environment. Typically, an application environment specification will identify Resources 140 at the file and/or inode level for inclusion in the application specific runtime environment. This can be a problem when more than one of Resources 140 has the same name within the Resource Repository 130.

For example, an application environment specification may specify a file "libc.so.6" while Resource Repository 130 includes several different files having the name libc.so.6. These identically named files may come from different file families, provenances or packages. As is described in further detail elsewhere herein, Provisioning Server 320 is configured to first identify one or more files having a name that matches the file specified in the application environment specification. The Repository Metadata 150 associated with each of these files is then read. The read metadata typically includes any File Family Metadata 210, Provenance Metadata 220, Package Metadata 230 and File Metadata 240, associated with each file.

Provisioning Server 320 is further configured to compare the read metadata with provisioning metadata part of which is optionally stored in Target Data Storage 190. Provisioning metadata is metadata that characterizes the target platform, user input, the operating system or executable application to be provisioned, or the like. For example, provisioning metadata may include a characteristic of the target platform, an application feature selection entered by a user, an application name, and a version number entered by a user. The comparison between the Repository Metadata 150 and the provisioning metadata may include various optional numerical algorithms including weighted average, preference ranking and or absolute matching to implement the metadata comparison.

Provisioning Server 320 is optionally further configured to select one of the several different files having the same name for inclusion in the application specific runtime environment based on the comparison between Repository Metadata 150 associated with each of the files and provisioning metadata. For example, an application name, version number, and hardware device description of the target platform may be compared with File Family Metadata 210A, Package Metadata 230D and File Metadata 240E to determine if the file associated with File Metadata 240E should be included in the application specific runtime environment.

Provisioning Server 320 is optionally further configured to determine if the file package of which a selected file is a member is included in an exclusion list. If the file package is included in the exclusion list, then the identifiers of other file packages with which the file package conflicts (according to the exclusion list) are added to an installation specific conflict list. The installation specific conflict list is a list specific to a specific application and a specific installation of that application on a target platform. Each time a file is selected from Resource Repository 130 the file package to which the selected file belongs is identified and if this file package is identified in the installation specific conflict list, then an alternative file is selected. Further details of this process are discussed elsewhere herein.

In some embodiments, Processor Array 340 includes one or more Processing Nodes 350, each configured to support execution of at least one application specific runtime environment. Processor Array 340 is optionally distributed among more than one device. In some embodiments, Processor Array 340 includes a rack and a plurality of processing blades. In some embodiments, Processor Array 340 includes a plurality of geographically distributed servers. In some embodiments, Processor Array 340 includes a one or more virtual machines. In these embodiments, the one or more Processing Nodes 350 may be virtual machines or may include any number of virtual machines. In alternative embodiments, Provisioning Server 320 is configured to provision an application specific runtime environment on a Processing Node 350 that is not part of a processor array. This Processing Node 350 may include, for example, a single application server. In these embodiments, Processor Array 340 is optional.

In some embodiments, Application Provisioning System 300 includes a Virtual Machine Manager 360. Virtual Machine Manager 360 is configured to create a virtual machine container within Processor Array 340. This virtual machine container is optionally created using a virtual machine specification. Virtual Machine Manager 360 is optionally further configured to load an image of the application specific runtime environment generated by Provisioning Server 320 into the virtual machine container.

In some embodiments, Virtual Machine Manager 360 is configured to create a virtual machine having characteristics adjusted to more optimally fit the requirements of an executable application and/or operating system. These characteristics are optionally adjusted by considering the resources required by the executable application as identified in the associated application environment specification. For example, the virtual machine may be defined using information included in the application environment specification. In some embodiments, the application environment specification includes information regarding the memory needed to store required resources during execution and/or the memory required for the allocation of variables and the like during execution. Use of this information allows creation of a virtual machine that includes characteristics that are tuned for a specific executable application. The tuned virtual machine is more resource efficient than would be possible without this information. In some embodiments, the virtual machine is provisioned. For example, in some embodiments, Virtual Machine Manager 360 and/or Provisioning Server 320 are configured to determine an amount of memory to include in a virtual machine based on memory requirements included in the application environment specification.

In some embodiments, Virtual Machine Manager 360 is configured to manage allocation of the application specific runtime environment image between working memory (e.g., volatile random access memory) and a hard drive. Thus, an executable application can be automatically redeployed in new virtual machine provisioned with a new application specific runtime environment if it is found that a current application specific runtime environment and/or virtual machine are inadequate. This redeployment may be transparent to an end user. In some embodiments, Virtual Machine Manager 360 is configured to automatically create the virtual machine environment in response to a request to execute the executable applications. In some embodiments, Virtual Machine Manager 360 comprises virtual machine management software available from VMware, Inc. Virtual Machine Manager 360 is optionally configured to support a plurality of virtual machines simultaneously on Processor Array 340, and as such support the execution of a plurality of different executable applications and/or copies of the same executable application.

During execution of an executable application, communication between External Interface 310 and the executable application may occur through Provisioning Server 320, through Virtual machine Manager 360, and/or directly between External Interface 310 and Processor Array 340. Provisioning Server 320 and Virtual Machine Manager 360 may include hardware, firmware, and/or software embodied on a computer readable medium.

In various embodiments Application Provisioning System 300 is configured for installation and execution of an operating system within one or more of Processing Nodes 350. This operating system is optionally configured to execute within the specific hardware and/or software environment of the member of Processing Nodes 350 on which it is installed. For example, the operating system may include drivers specific to hardware included in Processing Nodes 350.

In some embodiments, Repository 330 is configured to store an image of the operating system for execution on Processing Nodes 350. This image is optionally compressed and is optionally in an executable form configured for execution in a specific hardware environment. For example, the image may be generated by first installing the operating system in a hardware and software environment similar or identical to that of one of Processing Nodes 350. This installation produces an executable form of the operating system. A copy of the installed operating system is then stored in Repository 330. In some embodiments, by using an image of an operating system in an executable form, installation of the operating system on Processing Nodes 350 can be accomplished in a shorter time than if the operating system is stored in a non-executable form. The executable form is distinguished from non-executable forms in that the executable form can be executed or booted without or with minimal further installation. For example, decisions relating to operating system configuration and/or hardware environment that are normally made during the installation process have typically already been made in the executable form. The executable form is, therefore, optionally configured for a specific hardware environment and/or a specific operating system configuration. The executable form can typically be executed without further hardware discovery.

An operating system configuration may include a resource allocation or specific features. For example, a first operating system configuration may include a debug utility while a second configuration of the same operating system may not include the debug utility. In a more specific example, in embodiments where the operating system includes the ESX operating system available from VMware, Inc., a first configuration may be 272 MB in size and be configured to support 16 instances of a virtual machine container, and a second configuration may be 192 MB in size and be configured to support 8 instances of the virtual machine container. These two configurations have different allocations of a resource, e.g., storage. Repository 330 is optionally configured to store a plurality of compressed images of an operating system, each of the plurality being configured for execution in a different hardware environment and/or having a different operating system configuration. In some embodiments an application environment specification is configured for provisioning of an operating system on a target platform and also references an installation package for an executable application to be installed on the target platform.

Repository 330 is optionally further configured to store a decompressor and/or a configuration file. The decompressor is configured to decompress the operating system image on Processing Nodes 350. The configuration file is optionally compressed and is configured to characterize the operating system image. The configuration file is used by the operating system while executing on Processing Nodes 350. In some embodiments, the configuration file includes an ESX.config file configured to be used by the ESX operating system. The decompressor and/or the configuration file are optionally included in the operating system image.

Provisioning Server 320 is optionally further configured for transferring the operating system image, the decompressor, and/or the configuration file from Repository 330 to members of Processing Nodes 350 or some other target platform. In some embodiments, Provisioning Server 320 is configured to determine the specific hardware environment of a target platform prior to transferring the compressed image to the target platform. In these embodiments, the determined specific hardware environment may be used to select which of a plurality of different operating system images is appropriate for a specific target platform.

In some embodiments, members of Processing Nodes 350 include more than one logical partition. A logical partition may include, for example, a hard drive divided into two separately addressable storage areas. In these embodiments, a first logical partition is configured to receive the operating system image and a second logical partition includes the specific environment for which the operating system image is configured. Installation of the operating system is optionally accomplished by copying the operating system image to the first logical partition as a compressed file and then decompressing the operating system image into the second logical partition.

Figure 4:
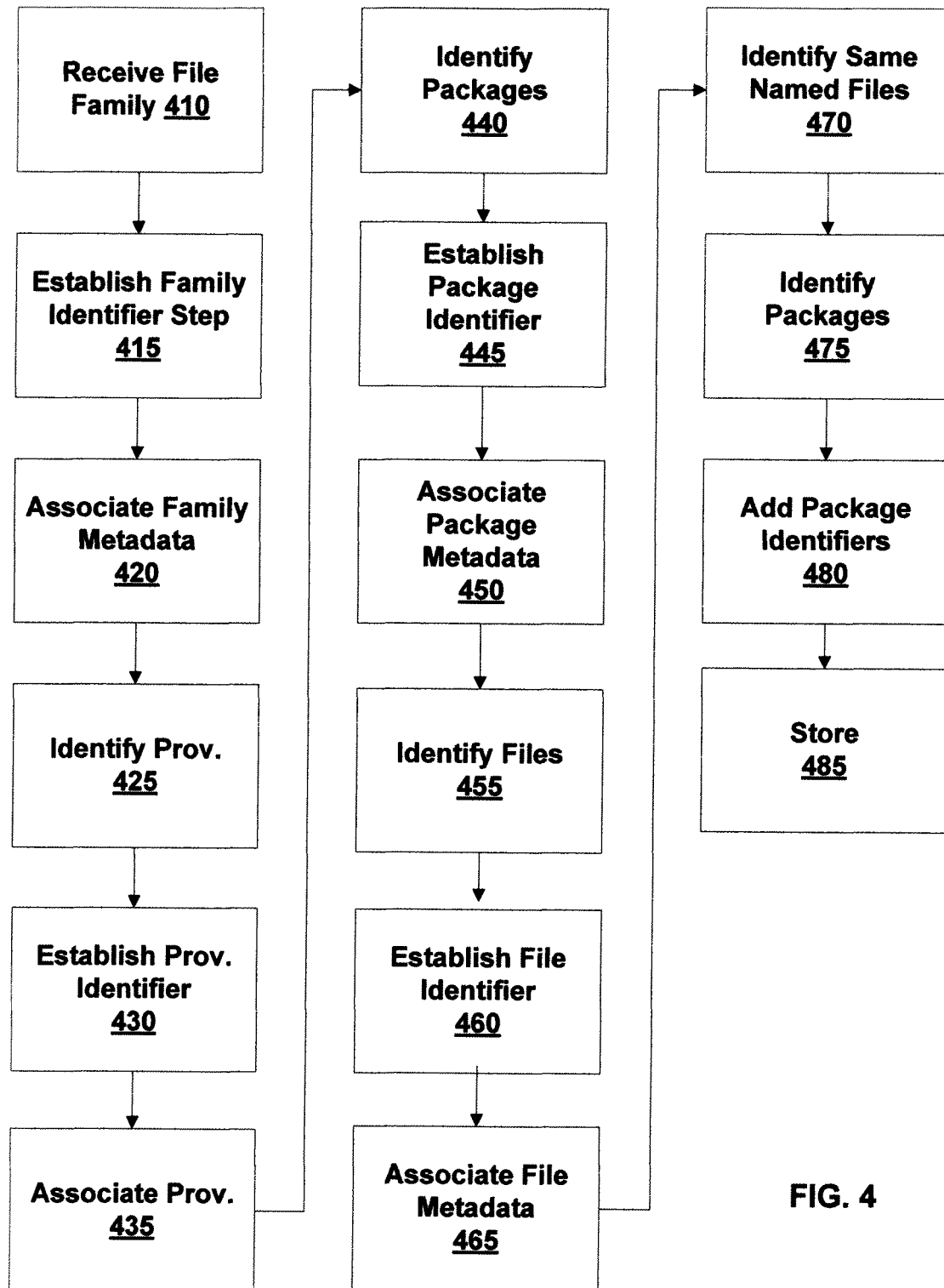
FIG. 4 illustrates a method of generating repository metadata, according to various embodiments of the invention.

FIG. 4 illustrates a method of generating Repository Metadata 150, according to various embodiments of the invention. In these embodiments, executable applications and/or operating systems are received by Provisioning Server 320 for storage in Repository 330. The executable applications and/or operating systems are processed to generate Repository Metadata 150 and this Repository Metadata 150 is stored in Repository 330. In some cases, the received executable applications and/or operating systems are received as part of a package that is then deconstructed to the level of individual files.

In a Receive File Family Step 410, a file family including an executable application and/or operating systems is received. For example, in various embodiments the received file family includes the Vista operating system from Microsoft Corporation, the ESX operating system from VMware, Inc, or BEA's WebLogic application running in conjunction with RedHat's Linux operating system. The file family may be received via External Interface 310, received via a computing network, received stored on a computer readable media, or the like. For example, in some embodiments, Receive File Family Step 410 includes inserting a set of compact disks into External Interface 310 and copying an installation package from these compact disks to Provisioning Server 320. In some embodiments, Receive File Family Step 410 includes receiving a plurality of different installation packages for an application or an operating system. In some embodiments, Receive File Family Step 410 includes receiving a plurality of different installation packages for a plurality of applications and/or operating systems. The installation packages are deconstructed to the library and/or file level. Receive File Family Step 410 optionally occurs over time. For example, part of the file family may be received on one day and part of the file family may be received on a different day.

In an Establish Family Identifier Step 415, a family identifier is established for the file family received in Receive File Family Step 410. This family identifier may be the name of the executable application, e.g. WebLogic, an operating system e.g., RedHat Linux 4.4, or some label assigned by Provisioning Server 320. For example, the family identifier may include a pointer, an alphanumeric, a storage location, a path, an internet protocol address, a universal resource locator, and/or the like. The family identifier is unique across one or more Repository 330.

In an Associate Family Metadata Step 420, File Family Metadata 210 is associated with the unique family identifier. This File Family Metadata 210 may include version information, pseudonyms, source information, license/ownership information, and/or the like. The File Family Metadata 210 may be entered by a user via External Interface 310 or derived from the received file family using Provisioning Server 320. For example, some installation packages include a publisher name or copyright holder that is read by Provisioning Server 320 and identified as File Family Metadata 210.

In an optional Identify Provenances Step 425, one or more provenances are identified within the file family received in Receive File Family Step 410. These provenances may include different service packs, patches, variations within a file family that occur over time, and/or the like.

In an optional Establish Provenance Identifier Step 430, the one or more provenances identified in Identify Provenances Step 425 are each assigned a provenance identifier. This provenance identifier is optionally unique within a particular file family and may include an alphanumeric label, a pointer, a memory location, a path, an internet protocol address, a universal resource locator, or the like.

In an optional Associate Provenance Metadata Step 435, Provenance Metadata 220 is associated with the one or more provenance identifier established in Establish Provenance Identifier Step 430. This metadata may include identifying information regarding different service packs, patches, variations within a file family that occur over time, and/or the like. This metadata may also include a link to the File Family Metadata 210 associated with the file family of which the provenance is a member, respectively. For example, the Provenance Metadata 220B includes a link to File Family Metadata 210A. This link is optionally the family identifier for File Family Metadata 210A.

In an Identify Packages Step 440, one or more packages within the file family received in Receive File Family Step 410 are identified. These packages may be within different provenances. In some embodiments a package is unique to a specific provenance while in other embodiments a package can be included in more than one different provenance.

In an Establish Package Identifier Step 445, a package identifier is established for each of the one or more packages identified in Identify Packages Step 440. This identifier may include an alphanumeric label, a pointer, a memory location, a path, an internet protocol address, a universal resource locator, or the like. The package identifiers are optionally unique to the Repository 330, provenance(s) and/or file family(ies) of which each package is a member.

In an Associate Package Metadata Step 450, Package Metadata 230 is associated with each of the package identifiers established in Establish Package Identifier Step 445. This Package Metadata 230 may include, for example, version information, software compatibility information, hardware requirements or feature information. This Package Metadata 230 further includes links to the File Family Metadata 210 and/or Provenance Metadata 220 associated with the file family(ies) and/or provenance(s) of which each package is a member, respectively. For example, Package Metadata 230D includes a link to Provenance Metadata 220C and optionally to File Family Metadata 210A.

In an Identify Files Step 455, one or more files within the file family received in Receive File Family Step 410 are identified. These files are optionally within different packages and/or provenances. In some embodiments a file is unique to a specific package or provenance while in other embodiments a file can be included in more than one package or provenance.

In an Establish File Identifier Step 460, a file identifier is established for each of the plurality of files, the file identifiers are optionally unique within each of the plurality of packages, provenances, file families and/or Repository 330. For example, a file identifier may be unique to a particular package but not to a file family. File identifiers need not be unique to a file family or resource repository 130. The file identifiers may include an alphanumeric label, a pointer, a memory location, a path, an internet protocol address, a universal resource locator, or the like. In some embodiments, the file identifiers include the name of the file, e.g. "libc.so.6."

In an Associate File Metadata Step 465, File Metadata 240 is associated with each of the one or more of files identified in Identify Files Step 455. This File Metadata 240 may include file tags, permissions, paths, checksums, file types, time and date stamps, and/or the like. This File Metadata 240 further includes a link to the Package Metadata 230, Provenance Metadata 220 and/or File Family Metadata 210 associated with the package provenance and/or file family of which each file is a member, respectively. For example, in some embodiments File Metadata 240F includes links to Package Metadata 230F, Provenance Metadata 220C and File Family Metadata 210A, while in other embodiments File Metadata 240F includes a link to Package Metadata 230F but not directly to File Family Metadata 210A. Because File Metadata 240 includes links to the other types of metadata, it is possible to read all of the metadata related to a file by navigating these links. For example, having identified a file associated with File metadata 240C it is possible to navigate links to Package Metadata 230B, Provenance Metadata 220A and File Family Metadata 210B. This process is discussed further elsewhere herein, for example in reference to FIG. 5.

In an Identify Same Named Files Step 470, any files within the same file family and having the same, e.g., identical, file names are identified. This is typically accomplished by parsing a list of names of files identified in Identify Files Step 455.

In an Identify Packages Step 475, File Metadata 240 is used to determine the packages to which the same named files identified in Identify Same Named Files Step 470 belong. This step may include, for example, identifying a pointer or other package identifier.

In an Add Package Identifiers Step 480, the identities of the file packages identified in Identify Package Step 475 are added to an exclusion list. As discussed elsewhere herein, the identities of files in the exclusion list are typically stored in groups of identifiers associated with same named files.

Identify Same Named Files Step 470, Identify Packages Step 475 and Add Package Identifiers Step 480 are optional. Identify Same Named Files Step 470, Identify Packages Step 475 and Add Package Identifiers Step 480 may be performed independently from other steps illustrated in FIG. 4. For example, these steps may be performed when a file family is updated via a patch or the like. Optionally, a user may add installation packages to the exclusion list manually.

In a Store Step 485, the family identifier, File Family Metadata 210, provenance identifiers, Provenance metadata 220, package identifiers, Package Metadata 230, file identifiers, and File Metadata 240 developed in Steps 410 through 475 are stored in a hierarchical data structure as Repository Metadata 150 within Repository 330. For example, in some embodiments, this information is stored on a hard drive within Computing System 100. Store Step 485 optionally includes storing the exclusion list developed in Identify Same Named Files Step 470, Identify Packages Step 475 and Add Package Identifiers Step 480 as Repository Metadata 150 within Repository 330. The exclusion list is optionally stored as File Family Metadata 210.

Figure 5:
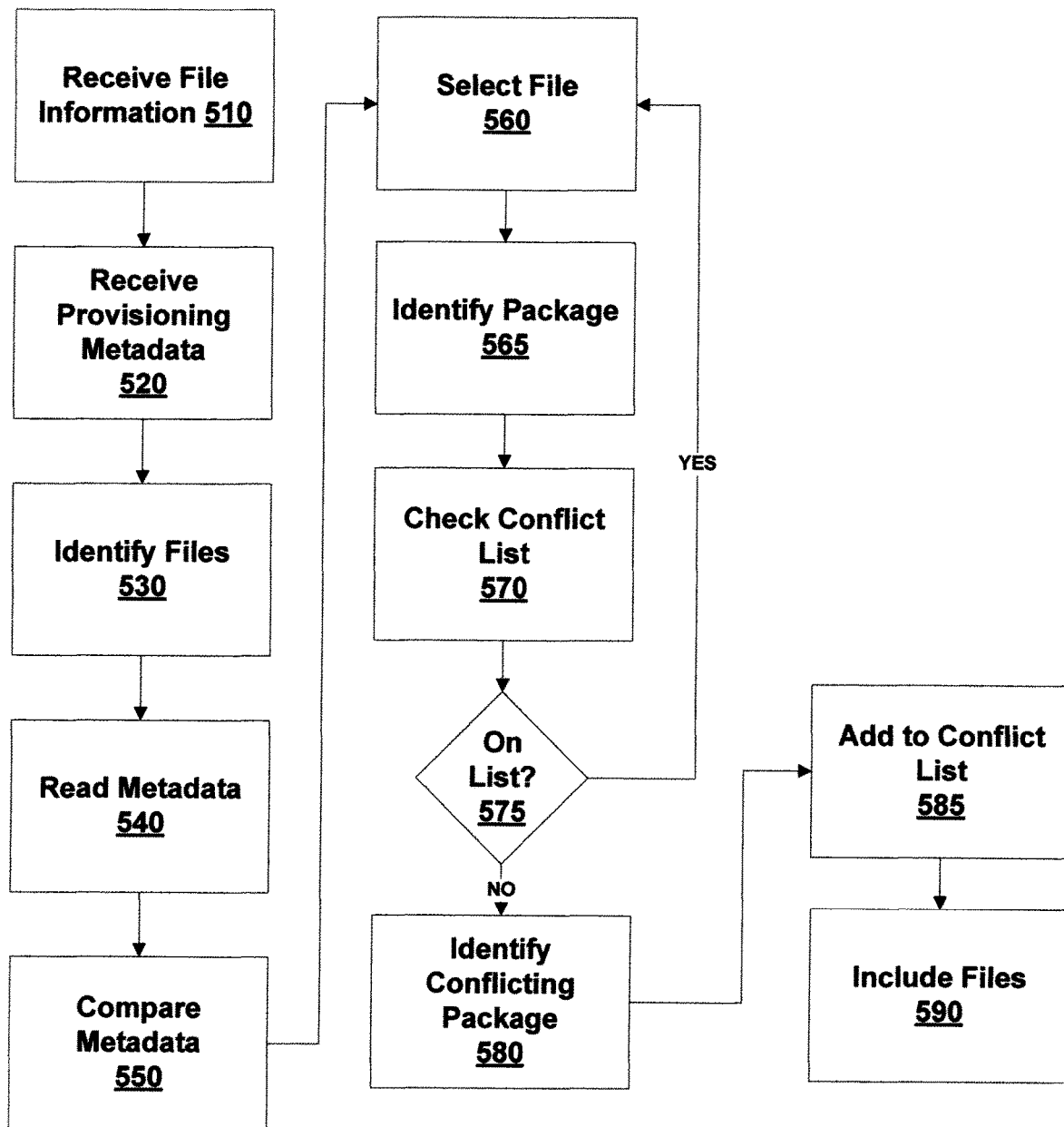
FIG. 5 illustrates a method of using repository metadata to select a file, according to various embodiments of the invention.

FIG. 5 illustrates a method of using repository metadata to select a file, according to various embodiments of the invention. Using this method, Provisioning Server 320 can select from among a plurality of similarly named files within Repository 330. For example, if an application environment specification cites a file "libc.so.6" and a plurality of files within Repository 330 have this name, then the method illustrated in FIG. 5 can be used to select a preferred member of the plurality for inclusion in an application specific runtime environment. A plurality of files within Repository 330 may have the same or similar names because Resource Repository 130 typically includes files from a plurality of file families, provenances and/or packages.

In a Receive File Information Step 510, information about a file is received by Provisioning Server 320. This information typically includes a file identifier that was included in an application environment specification. For example, the application environment specification may specify that "libc.so.6" be included in an application specific runtime environment.

In a Receive Provisioning Metadata Step 520, provisioning metadata is received by Provisioning Server 320. This provisioning metadata characterizes an application specific runtime environment or target platform. For example, in some embodiments, the provisioning metadata characterizes the target platform, a user input, the operating system or executable application to be provisioned. Provisioning metadata may include a specific application version, a service pack, an application or operating system feature set requested by a user, as well has the model of a hardware I/O device included within the target platform. In some embodiments, part or all of the provisioning metadata is generated by a software agent configured to examine and identify characteristics of the target platform. In some embodiments, all or part of the provisioning metadata is received from a user via External Interface 310. In some embodiments, all or part of the provisioning metadata is stored in an application environment specification.

In an Identify Files Step 530, the file information, e.g., file identifier, received in Receive File Information Step 510 is used to identify one or more files within Repository 330. For example, if the file identifier includes the file name "libc.so.6," then in Identify Files Step 530 files with Resource Repository 130 having the file name "libc.so.6" are identified. As discussed elsewhere herein, more than one file within Resource Repository 130 may have this file name. Typically, a storage location of each of the identified files is recorded by Provisioning Server 320.

In a Read Metadata Step 540, Repository Metadata 150 associated with each of the files identified in Identify Files Step 530 is read by Provisioning Server 320. The read metadata optionally includes not only the File Metadata 240 but also any Package Metadata 230, Provenance Metadata 220 and/or File Family Metadata 210 that is associated with the package, provenance and/or file family of which the particular file is a member, respectively. For example, if one of the identified files is associated with File Metadata 240C, then File Metadata 240C, Package Metadata 230B, Provenance Metadata 220A and/or File Family Metadata 210B are read. The read Repository Metadata 150 optionally includes an identity of a file package of which at least one of the files identified in Identify Files Step 530 is a member.

In a Compare Metadata Step 550, the provisioning metadata received in Receive Provisioning Metadata Step 520 is compared with the Repository Metadata 150 read in Read Metadata Step 540. This comparison can include an absolute match requirement, weighting algorithms, a nearest match algorithm, ranked preferences, and/or the like. For example, in some embodiments, an absolute match requirement is used for an application version and a nearest match algorithm is used to select from a plurality of possible drivers for hardware included in the target platform. In some embodiments, Compare Metadata Step 550 includes an algorithm that considers the success of past file selections. Receive Provisioning Metadata Step 520 may occur anytime before Compare Metadata Step 550.

In a Select File Step 560, one of the one or more files identified in Identify Files Step 530 is selected based on the comparison made in Compare Metadata Step 550. For example, if four files within Repository 330 are found to have the file name "libc.so.6," then one of these four is selected based on the best match between the Resource Metadata 150 read in Read Metadata Step 540 and the provisioning metadata received in Receive Provisioning Metadata Step 520. In some embodiments, the selection made in Select File Step 560 is cached in association with the application environment specification. In these embodiments, if the cache is current, the cached selection may be used the next time the application environment specification is used, instead of repeating the steps illustrated in FIG. 5. The use of a cached selection is optionally dependent on the identity of a user, a target platform, and/or provisioning metadata entered by the user.

In an optional Include File Step 570, the file selected in Select File Step 560 is included in an application specific runtime environment.

In an Identify Package Step 565, the file package of which the file selected in Select File Step 560 is a member is identified. This may be performed by, for example, using a pointer, name, or other package identifier included in File Metadata 240 associated with the selected file.

In a Check Conflict List Step 570, the identity of the file package identified in Identify Package Step 565 is compared with an installation specific conflict list. The installation specific conflict list is a list that is developed and maintained for a specific installation (provisioning) of an executable application or operating system. The installation specific conflict list includes the identities of packages with which there would be a conflict because of a previously selected file.

In an On List? Step 575, the next step in the method is determined based on whether the file package identified in Identify Package Step 565 is included in the installation specific conflict list or not. If the file package is included, then the method returns to Select File Step 560 where an alternative file is selected. If no alternative file is available, then previously selected files may be deselected to eliminate a conflict or the process may abort.

If the file package is not included in the installation specific conflict list, then in an Identify Conflicting Package Step 580, the exclusion list is examined to determine if there are any packages with which the package identified in Identify Package Step 565 conflicts. This step may include, for example, searching the exclusion list for an identifier of the package of which the selected file is a member and reading any other package identifiers within the same group.

In an Add to Conflict List Step 585, the identities of any conflicting packages identified in Identify Conflicting Package Step 580 are added to the installation specific conflict list. By adding these identities to the installation specific conflict list files that are members of these conflicting packages can be avoided, e.g., using Check Conflict List Step 570. The installation specific conflict list may be saved or discarded after the installation is completed.

In an optional Include Files Step 590, the file selected in Select File 560, and not on the installation specific conflict list, is included in an application specific runtime environment or a general runtime environment. This application specific runtime environment is optionally provisioned within Processor Array 340.

Steps 560 through 590 may be performed for each file in a parallel and/or serial manner. For example, they may be repeated serially for each resource to be included in an application specific runtime environment or a general runtime environment. In some embodiments Steps 510 through 530 are performed in parallel for a plurality of files while Steps 540 through 590 are performed serially for each file. While the methods illustrated in FIG. 5 include the selection of files. It will be apparent to those of ordinary skill in the art that these methods can be adapted to the selection of inodes. Further, it will be apparent to those of ordinary skill in the art that the steps illustrated in FIGS. 4 and 5 may be performed in alternative orders.

Several embodiments are specifically illustrated and/or described herein. However, it will be appreciated that modifications and variations are covered by the above teachings and within the scope of the appended claims without departing from the spirit and intended scope thereof. For example, while the examples included herein include File Family Metadata 210, Provenance Metadata 220, Package Metadata 230 and File Metadata 240, the same set of metadata may be stored merely in association with a file identifier, or file identifier and package identifier. For example, in alternative embodiments, the information discussed herein as being included in File Family Metadata 210, Provenance Metadata 220, and/or Package Metadata 230 may all be included in the File Metadata 240 in a flat data structure, a relational database, an object oriented database, a data grammar, an XML database, a file system, stored as external attributes to the file, and/or the like.

Further, while the examples discussed herein are focused on the avoidance of conflicts based on file names, the same systems and methods may be adapted to avoid conflicts in file dates, file size, ownership, access privileges, user specified relationships, and/or the like.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   one or more processors;

a repository configured to store a plurality of resources and repository metadata, the repository metadata being configured to characterize a plurality of files in a plurality of packages, each of the plurality of packages including a set of files from the plurality of files, and the repository metadata including an exclusion list that adds identifiers of at least a portion of the plurality of packages when the at least the portion of the plurality of packages include a file that has a same name and different data as a file in another package of the plurality of packages, the exclusion list not including identifiers of packages from the plurality of packages when the at least the portion of the plurality of packages include a file that has a same name and same data as a file in another package of the plurality of packages; and a provisioning server that causes the one or more processors to perform the following operations:

select a file from among the plurality of files for provisioning of an executable application or an operating system, the selection ensuring that no package from the selected file is in the exclusion list, and provision the executable application or the operating system on a computing device by providing the selected file to the computing device for inclusion in a runtime environment.

2. The system of claim 1, wherein the computing device comprises a virtual machine and the provisioning server is configured to provision the executable application or the operating system on the virtual machine.

3. The system of claim 1, wherein the computing device is one of a plurality of computing devices and the provisioning server is configured to provision the executable application or operating system on the plurality of computing devices.

4. The system of claim 1, wherein the repository metadata further comprises package metadata.

5. The system of claim 1, wherein the plurality of resources are configured for provisioning of a plurality of different executable applications or operating systems.

6. The system of claim 1, wherein the provisioning server is configured to select the files based on an application environment specification, and wherein the application environment specification identifies a set of files that is limited to only those files that are required to execute the executable application or the operating system.

7. The system of claim 1, wherein the provisioning server is configured to select the files from among the plurality of resources by comparing the repository metadata with provisioning metadata.

8. The system of claim 1, wherein the repository metadata includes more than one exclusion list with each exclusion list being associated with a different file family.

9. The system of claim 1, further comprising an installation specific conflict list including identification of a package that includes a file that conflicts with a file selected for inclusion in the specific installation.

10. The system of claim 1, wherein the provisioning server is further configured to rebuild the exclusion list when additional resources are added to the repository.

11. A method comprising:

storing, by a computer system, a plurality of resources and repository metadata, the repository metadata being configured to characterize a plurality of files in a plurality of packages, each of the plurality of packages including a set of files from the plurality of files, and the repository metadata including an exclusion list that adds identifiers of at least a portion of the plurality of packages when the at least the portion of the plurality of packages include a file that has a same name and different data as a file in another package of the plurality of packages, the exclusion list not including identifiers of packages from the plurality of packages when the at least the portion of the plurality of packages include a file that has a same name and same data as a file in another package of the plurality of packages; and selecting, by the computer system, files from among the plurality of files for provisioning an executable application or an operating system, the selecting ensuring that no package of any one of the selected files is in the exclusion list;

provisioning, by the computer system, the executable application or the operating system on a computing device by providing the selected files to the computing device for inclusion in a runtime environment; and upon provisioning the executable application or the operating system, executing the executable application or the operating system.

12. The method of claim 11, wherein the computing device comprises a virtual machine, wherein provisioning comprises provisioning, by the computer system, the executable application or the operating system on the virtual machine.

13. The method of claim 11, wherein selecting comprises selecting, by the computer system, the files based on an application environment specification, and wherein the application environment specification identifies a set of files that is limited to only those files that are required to execute the executable application or the operating system.

14. The method of claim 11, wherein selecting comprises selecting, by the computer system, the files from among the plurality of resources by comparing the repository metadata with provisioning metadata.

15. The method of claim 11, wherein the repository metadata includes more than one exclusion list with each exclusion list being associated with a different file family.

16. The method of claim 11, further comprising an installation specific conflict list including identification of a package that includes a file that conflicts with a file selected for inclusion in the specific installation.

17. The method of claim 11, wherein the computing system is further configured to rebuild the exclusion list when additional resources are added to the repository.

18. A method comprising:

receiving, by a computer system, a file family including a plurality of files;

identifying, by the computer system, any files having a same name in the file family;

identifying, by the computer system, packages in which the identified files are included;

adding, by the computer system, the identified packages to an exclusion list when the identified packages include a file that has the same name and different data and not adding any of the identified packages to the exclusion list when the identified packages include a file that has the same name and same data;

assigning an identifier to the identified packages in the exclusion list;

storing, by the computer system, the exclusion list in association with the file family;

identifying files from among the plurality of files for provisioning an executable application or an operating system;

upon determining that that no package selected for the provisioning of the executable application or the operating system are included in the exclusion list, selecting the identified files;

provisioning the executable application or the operating system on a computing device by providing the selected files to the computing device for inclusion in a runtime environment, and upon provisioning the executable application or the operating system, executing the executable application or the operating system.

19. The method of claim 18, further including adding the selected files to a resource repository configured to store files of several file families.

20. The method of claim 18, further including repeating the identifying any files, the identifying packages and the adding the identified packages, when additional files are added to a resource repository.

\* \* \* \* \*